Patented June 14, 1949

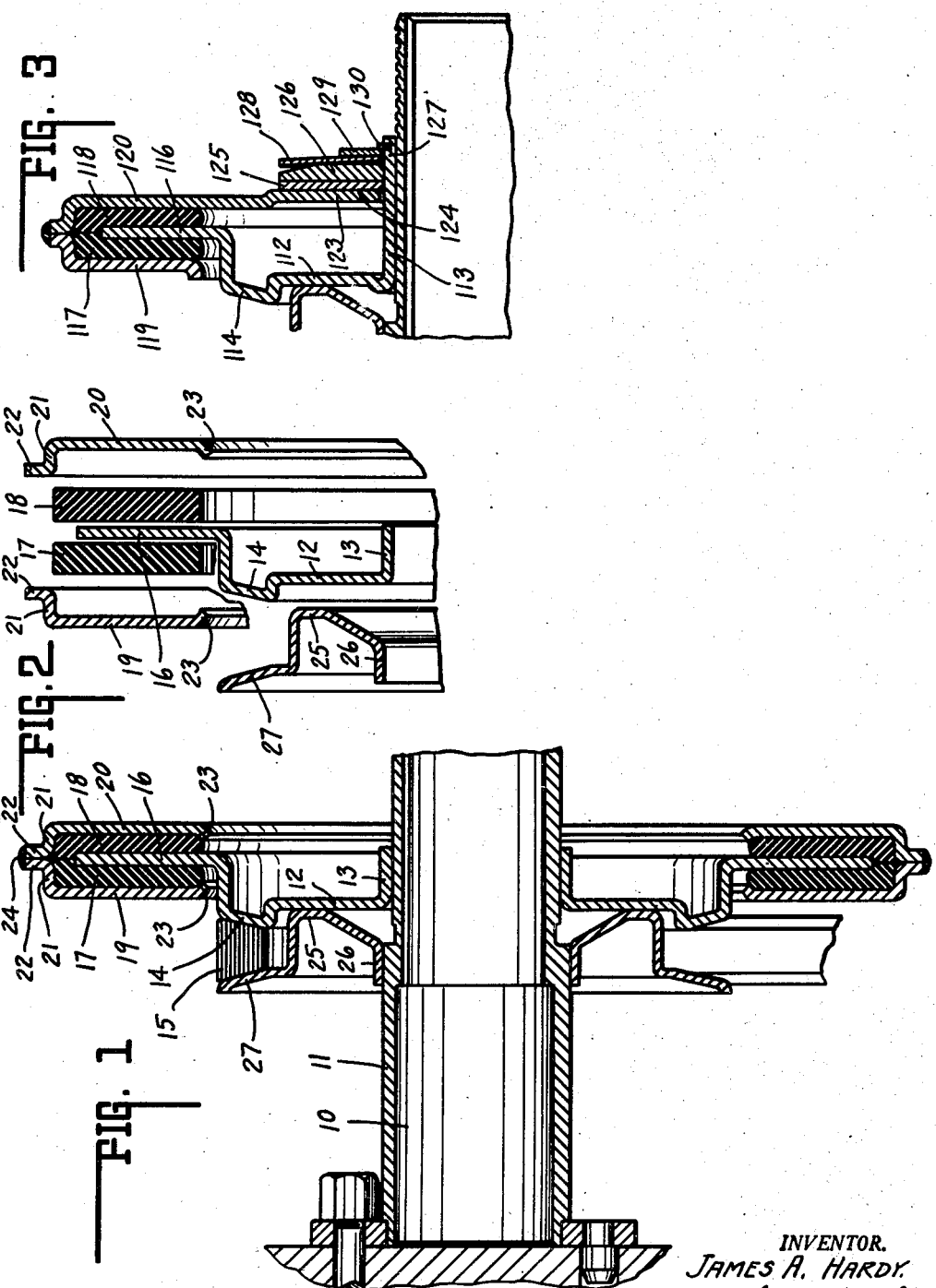

2,473,335

UNITED STATES PATENT OFFICE 2,473,335

VIBRATION DAMPER

James A. Hardy, Indianapolis, Ind., assignor to Schwitzer-Cummins Company, Indianapolis, Ind., a corporation Application June 19, 1946, Serial No. 677,688

2 Claims. (Cl. 74—574)

This invention relates to a vibration damper, illustrated herein as mounted on a crank shaft of an internal combustion engine, although it is adaptable to any other shaft, particularly when rotated by an internal combustion engine and subjected to torsional deflection produced by the explosive forces thereof.

The principal object of the invention consists in the structural arrangement, form and relation of the elements making up the damper for convenient and economical production and assembly, and particularly wherein the damper structure may incorporate and include a driving pulley for any accessory such as a fan for the cooling system of the engine. To this end the damper is assembled from preformed parts which may comprise sheet metal stampings, pressed and secured in assembled relation with resilient material such as rubber interposed between a supporting plate connected to the shaft and an inertia element clamped therewith. This arrangement avoids the necessity of vulcanizing or surface bonding the interposed rubber or similar resilient material as between the support and the inertia element, while at the same time obtaining the desired shearing action of the rubber or resilient material to permit relative rotational movement between the inertia element and the supporting plate of the shaft.

A further object of the invention resides in the arrangement of the damper structure wherein it may embody the combination of both frictional and elastic resistance to displacement of the inertia member. This combination permits of a damping action through a wider range than is possible when one or the other is employed singly. Thus, if a friction damper alone is employed it may be necessary to compromise the frictional resistance so that the damper is sufficiently stiff to damp out the vibration at high speed, but not so stiff as to damp the vibration at low speed.

Through the combination of the resilient and friction dampers combined, either may be sufficiently yielding to take care of all the vibrations at low speed and the other set sufficiently resilient to take care of the high speeds.

The full nature of the invention will be understood from the accompanying drawings and the following description and claims:

Fig. 1 is a central vertical section through the damper.

Fig. 2 is an exploded view of the structure showing the parts with portions thereof broken away.

Fig. 3 is a vertical section through a modified form of damper with parts broken away.

In the drawing there is shown a crank shaft 10 on one end of which there is rigidly secured for rotation therewith a sleeve 11 carrying a fan pulley and damper. The supporting flange for the damper consists of a sheet metal stamping formed to provide an annular drum 12 centrally flanged to develope an inner cylindrical collar 13 press fitted and secured to the sleeve 11. Radially outward from the collar 13, said drum is formed with an angular offset to provide one side wall 14 of the fan driving pulley for receiving the pulley belt 15. The drum 12 is formed with a radially and outwardly extending supporting plate 16.

The supporting plate 16 is adapted to receive on each side thereof, and extending in radial parallel planes therewith, rubber disks 17 and 18. Wherein said disks are preferably of rubber or rubber compound, they may comprise any equivalent resilient material. Mounted over and about the disk 17 there is a clamping plate 19 which may be formed of stamped sheet metal and over and about the rubber disk 18 there is a companion clamping plate 20. The rubber disks 17, 18 are of greater diameter than the supporting plate 16 so as to protrude beyond the peripheral edge thereof. Similarly, the clamping plates 19, 20 are of greater diameter and have their outer peripheries flanged inwardly at 21 and outwardly at 22, respectively. Said plates are inwardly coextensive with the rubber disks, the inner diameter thereof being slightly greater than that of the drum 12 and curved inwardly to form the annular shoulders 23. Said plates are clamped together so that their flanges 22 meet and the rubber disks 17, 18 are under compression against opposite faces of the supporting plate 16. In their clamped relation they are welded about the peripheral joinder of the flanges 22, as indicated at 24.

The belt receiving pulley for driving a cooling fan or the like is formed of a sheet metal stamping, companion to the drum 12 and angular offset 14. This part of the pulley is formed with an inwardly dished portion 25 welded or otherwise secured to the drum 12 and having an inner cylindrical flange portion 26 aligned with the collar 13 adapted to surround and be secured to the sleeve 11. The outer portion is angularly formed at 27 to provide a corresponding opposite pulley face to the offset 14 for receiving in conjunction therewith the fan belt 15.

The structural elements are preformed and arranged for assembly, as shown in Fig. 2, and are then clamped and rigidly secured together, as illustrated in Fig. 1, to provide a complete damper and pulley unit.

By means of the form and assembly of the parts, as above described, the clamping plates 19, 20 serve as an inertia element while the supporting plate 16 of the pulley drum 12 serves as a supporting flange therefor. The intermediate rubber disks 17, 18, by reason of being securely clamped under compression, supports the inertia member upon the supporting flange while permitting slight relative rotation therebetween due to the shearing action thereof.

In the modified form shown in Fig. 3, the clamping plate 120 is formed with a lower offset skirt portion 123 for providing an annular friction surface 124. Mounted adjacent the surface 124 there is a friction disk 125 maintained in frictional engagement therewith through a clutch plate 126. Said clutch plate is fixedly secured to an extension 127 on the collar 113 of the drum 112 and is backed up by a disk spring 128 and a retaining washer 129 which are locked in place by a locking ring 130 secured to the collar extension 127.

Associated with the clamping plate 120 is the companion clamping plate 119 between which the rubber disks 117 and 118 are clamped against the supporting plate 116 carried by the drum 112. Since the clamping plate 120 is rigidly secured to the clamping plate 119 and acts therewith as the inertia element, its relative movement with respect to the shaft and supporting plate, as permitted by the rubber disks, is frictionally resisted by the friction disk 125. By reason thereof, the damping action of the inertia element is augmented by the provision of a friction connection between the inertia element and the shaft, the combined action of the yielding and friction connections provide damping action of a wider range of critical frequencies.

In this form as shown in Fig. 3, there is provided a combination of resilient and friction dampers for the purpose above discussed, wherein one may be set to take care of all vibration at the lower speeds and the other set to take care of the vibrations at the higher speeds.

Thus, this combined frictional and resilient damper arrangement may be utilized in those cases which require the damping action to be extended in and over a wide range of critical frequencies.

The invention claimed is:
1. In a vibration damper for rotating shafts, the combination with a sleeve adapted to be secured to a shaft and having a hub portion, a radially extending supporting plate of stamped sheet metal having its inner portion flanged to provide a supporting collar adapted to be secured about said sleeve, a resilient rubber disk embracing the outer portion of said supporting plate in substantially spaced relation to said collar, a pair of opposed stamped sheet metal clamping plates co-extensive with and clamped about the outer faces of said rubber disk for providing an inertia element, the inner peripheral edges of each of said clamping plates being flanged inwardly toward said supporting plate at a substantial distance from the said collar thereof, and the outer peripheral portions of said clamping plates being flanged inwardly and radially outwardly to abut each other about the outer periphery of said rubber disk, and means for securing the abutting flanged portions of said clamping plates with said rubber disk compressed therebetween.

2. In a vibration damper for rotating shafts, the combination with a sleeve adapted to be secured to a shaft and having a hub portion, a radially extending supporting plate of stamped sheet metal formed to provide a drum portion centrally flanged to develop an inner cylindrical collar secured about said sleeve, said drum portion being formed with an angular offset ring portion to provide one side wall of a driving pulley, a flat rubber disk mounted face to face with the opposite faces of said supporting flange and extending beyond the periphery thereof for enveloping it, a pair of dished stamped sheet metal clamping plates mounted to embrace the outer faces of said rubber disk coextensive therewith and having their outer peripheries flanged inwardly and radially outwardly respectively, means for securing said clamping plates about the peripheries of their outwardly extending flanges to clamp said disk against said supporting flange for preventing relative displacement therebetween while permitting relative movement between said supporting flange and clamping plates, and a disk of stamped sheet metal secured to the annular drum portion of said supporting flange terminating in an angular offset about its peripheral portion to form the opposed side wall of the driving pulley.

JAMES A. HARDY.

REFERENCES CITED

The following references are of record in the file of this patent:

UNITED STATES PATENTS

| Number | Name | Date |
|---|---|---|
| 1,949,520 | Whisler | Mar. 6, 1934 |
| 2,383,400 | McFarland | Aug. 21, 1945 |

FOREIGN PATENTS

| Number | Country | Date |
|---|---|---|
| 514,854 | Germany | Dec. 18, 1930 |